Figure 1:
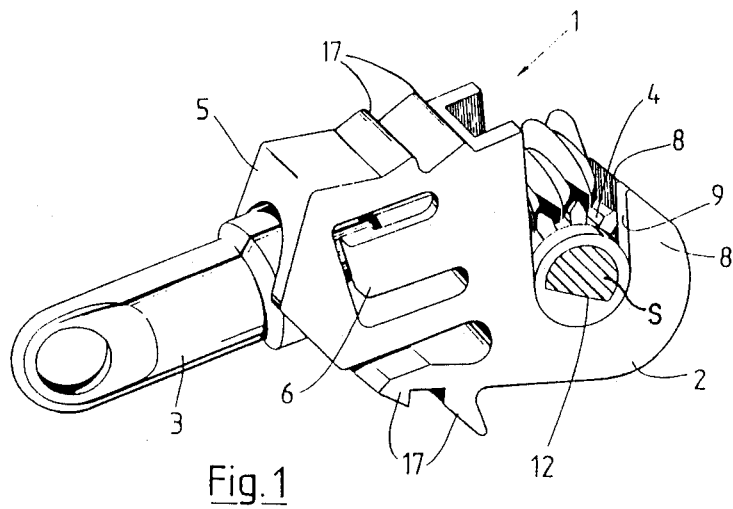

United States Patent [19]

Lindstrom

[11] Patent Number: 4,955,248
[45] Date of Patent: Sep. 11, 1990

[54] ANGULAR GEAR FOR VENETIAN BLINDS

[75] Inventor: Vincent Lindström, Bankeryd, Sweden

[73] Assignee: AB Perma System, Sweden

[21] Appl. No.: 315,282

[22] Filed: Feb. 24, 1989

[30] Foreign Application Priority Data

Mar. 1, 1988 [SE] Sweden .................. 8800720-8

[51] Int. Cl.⁵ .................................................. F16H 1/18
[52] U.S. Cl. ........................................ 74/424.5; 74/425; 160/176.1; 160/177
[58] Field of Search ............... 74/89.14, 425, 606 R, 74/424.5; 160/168.1, 176.1, 178.1, 900, 177, 178.2; 24/665, 672; 403/289, 326

[56] References Cited

U.S. PATENT DOCUMENTS

| 2,269,213 | 1/1942 | Lorentzen | 160/176.1 |
| 3,686,896 | 8/1972 | Rutter | 403/326 |
| 3,921,695 | 11/1975 | Debs | 160/176.1 |
| 4,214,622 | 7/1980 | Debs | 160/176.1 |
| 4,245,687 | 1/1981 | Vecchiarelli | 160/177 |
| 4,352,385 | 10/1982 | Vecchiarelli | 160/177 |
| 4,406,319 | 9/1983 | McNiel et al. | 160/177 |
| 4,522,245 | 6/1985 | Anderson | 160/177 |
| 4,637,445 | 1/1987 | Nilsson | 160/178.2 |
| 4,676,292 | 6/1987 | Valle et al. | 160/176.1 |

Primary Examiner—Peter R. Brown
Assistant Examiner—Brian K. Green
Attorney, Agent, or Firm—Witherspoon & Hargest

[57] ABSTRACT

The present invention relates shortly to an angular gear (1) for use in venetian blinds for angular adjustment of the venetian blind laths from a place beside the venetian blind. The angular gear (1) consists of three parts, a gear housing (2), a shaft (3) provided with a helical gear (10), and a pinion (4), the shaft (3) being provided with or constituting an operating means and a pinion (4) meshing with the helical gear (10) being anchored to the shaft suspending the venetian blind laths, by the aid of ladder bands attached to the shaft. The shaft (3) is provided with at least one bearing portion of circular cross section and this bearing portion cooperates with a complementary bearing portion in the gear housing (2). In connection to the bearing portion or portions there is a neck portion (14) in the shaft, and in the housing (2) there is at least one tongue (6) having a hook-like means which by the aid of the tongue is biassed to protrude into the neck portion and gear which maintains the shaft (3) in axial position in the gear housing (2).

3 Claims, 1 Drawing Sheet

ANGULAR GEAR FOR VENETIAN BLINDS

The present invention relates to equipment for adjustment of the angular position of the venetian blind laths between the two end positions thereof, in which the venetian blinds are to be regarded as closed, via the intermediate open position. More particularly, the invention relates to such an angular gear which transmits a turning movement from an operating means within easy reach and located in connection with a window or corresponding, into a rotation of the shaft from which the laths constituting the venetian blind are suspended, for adjustment to a desired angle position of the laths.

The technique of transmitting a rotation by the aid of angular gear from an operating means, such as a rod provided with a handle which is normal in connection with venetian blinds, into a rotation of the shaft from which the venetian blind laths are suspended by the aid of what is called ladder bands, is well known and is used especially in connection with free hanging venetian blinds. However, up to now the used technique is combined with some problems.

Such gears which have been previously used have, indeed, been satisfactory with regard to the operation but they have been complicated both with regard to the assembly of the gear itself as well as to the mounting thereof in the suspending or covering profile. Further, prior gears resulted in difficulties with regard to the location of angular gear as well as string lock beside each other and in desired order.

Figure 2:
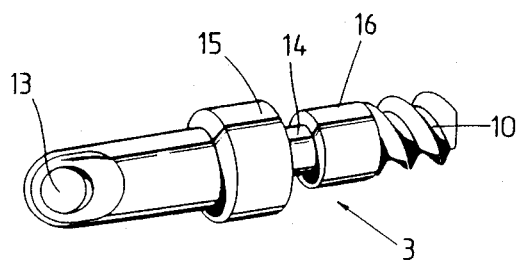
Figure 4:
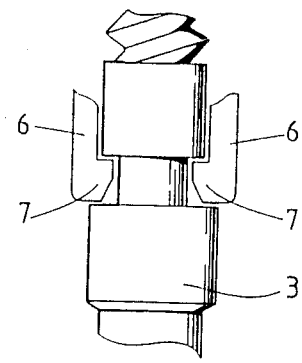
Figure 3:
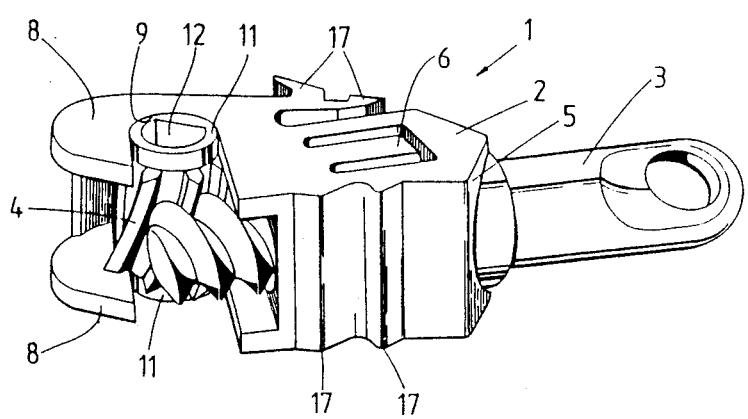

The invention is closer described in the following with reference to the attached drawings in which FIG. 1 is a side perspective view of an angular gear in accordance with the invention, FIG. 2 is a perspective view of the helical gear and the shaft belonging thereto formed in one and the same piece and included in an angular gear in accordance the invention, FIG. 3 is an edge side perspective view of the angular gear of FIG. 1, and FIG. 4 is a schematical cut away view showing the locking of the helical gear shaft against axial movement in the gear housing.

The angular gear 1 in accordance with the invention consists of three parts, a gear housing 2, a helical gear shaft 3 and a pinion 4. The assembly of these parts into the angular gear 1 is carried out without use of any tool and they are kept together by the resiliency of the material of locking tongues and similar. Also for mounting and retaining of the angular gear in a suspending profile the same structural idea is used.

The gear housing 2 is of a relatively longish shape and shows an essentially rectangular outer cross section. The one short end 5 which is intended to protrude a little through an opening in a suspending profile in the edge thereof, is tip-shaped in 90° corresponding to the shape of the profile so that the protruding end 5 tidily joins the shape of the profile. A circular opening for receiving the helical gear shaft 3 extends through the housing 2 from said short end 5 and a pair of tongues 6 which at the free ends thereof are provided with hook-like means 7, protrude one from each large side into the circular opening. At the other short end of the housing 2 the large sides are extended and form two parallel bend-like members 8 which in the openings 9 thereof are shaped to receive said pinion 4 normally to the longitudinal axis of the helical gear shaft 3.

Pinion 4 is provided with conventional teeth meshing with the helical gear 10 of the helical gear shaft 3. Axially outside the teeth, the pinion 4 is provided with a circular bearing surface 11, one on each side of the teeth. The pinion 4 shows an axial through-bore 12 the shape of, which corresponds to the one of the shaft S which is depicted in FIG. 1 extended through the pinion 4 and which is to be rotated together with the pinion 4.

At one end of the helical gear shaft 3 there is the helical gear 10 and at the other end there is a radial through-bore 13 for the connecting of an operating shaft or similar device. The portion of the shaft 3 provided with the bore 13 extends, hence, not only from the gear housing 2 but also out of the suspending profile for a venetian blind and accordingly, said portion has been given a pleasant aesthetical shape.

Substantially in the middle of the shaft 3 there is a neck portion 14 on each side of which there is a bearing portion 15, 16 of circular shape, the bearing portion 16 between the neck portion 14 and the helical gear 10 being of slightly less diameter than the other bearing portion 15. The circular opening of the gear housing 2 is of a shape corresponding to the bearing portions 15, 16 so that the shaft 3 is rigidly journalled in the radial direction but easy to rotate.

The hook-like means 7 of the tongues 6 are of such a shape that when the shaft 3 is entered into the housing 2 from the short end 5, the bearing portion 16 moves the tongues 6 resiliently outwards, but as soon as said hook-like means 7 reach the neck portion 14 they enter the neck portion by the resiliency and backdrawing of the shaft 3 is made impossible by the hook-like means 7.

For the rest, the mounting of the angular gear takes place in such a way that firstly, the pinion 4 is located in its place in the openings 9, some resiliency from the bend-like members 8 may be used for keeping the pinion 4 in position during the mounting. Thereafter, the shaft 3 is inserted through the hole in the housing 2 so that the helical gear 10 starts to mesh with the teeth of the pinion 4 and the shaft will then be in position and the hook-like means 7 engage the neck portion 14. So far the angular gear 1 is assembled.

The bearing portions 15, 16 offer a rigid control of the shaft 3 so that the meshing of the teeth of the pinion 4 with the helical gear 10 is maintained. However, in case of overload it is desired that the teeth are separated instead of being breaked and this is also allowed by the resiliency of the material of the different parts.

The housing 2 is also provided with external ridges 17 which in a resilient way brace the angular gear rigidly in the opening in the venetian blind suspending or covering profile. In this connection, the angular gear 1 can be mounted adjacent a conventional string lock which often is present in connection with venetian blinds, so that the string lock as well as the angular gear obtain firm bracing. The string lock may be located on either side of the angular gear. Preferably, the string lock will have its end wall pressing against the angular gear 1 so as to provide an obstacle which prevents an adjacent tongue 6 of the angular gear from springing outwards, a feature which prevents unintentional loosening of the shaft 3 from the gear housing in the event of an overload of the apparatus.

Hence, by the present invention an angular gear has been obtained which is cheap to manufacture especially due to the low number of parts included therein and which is simple to assemble as well as to mount in a suspending or covering profile.

I claim:

1. An angular gear comprising a gear housing, a helical gear extending from a shaft extending into said gear housing, and a pinion meshing with said helical gear for transmitting turning of said shaft of said helical gear to a turning rod extended through and rotatably fixed to said pinion for rotation of said rod, said shaft being provided with two axially spaced bearing portions of circular cross section and said gear housing having complementary bearing portions, a neck portion being provided between said two axially spaced bearing portions, said neck portion having a diameter which is less than the diameter of any of said two axially spaced bearing portions, and at least one resilient tongue integral with said gear housing and having a free end thereof comprising a hook-like means arranged for cooperation with said neck portion, said hook-like means resiliently protruding into said neck portion and locking said shaft in an axial position in said gear housing.

2. An angular gear in accordance with claim 1 wherein said pinion is provided with two tubular stub shafts which are concentric relative to said pinion and which extend axially from said pinion, one from each side of said pinion, said stub shafts being journalled in respective recesses in said gear housing, each respective recess being open in a radial direction for receipt of a respective stub shaft, said pinion being held in place relative to said recesses by said helical gear.

3. An angular gear in accordance with claim 1 wherein said gear housing comprises a flexible material which flexes to allow separation of said pinion and said helical gear when said angular gear is subject to an overload condition.

* * * * *